US010588030B2

(12) United States Patent
Shanmugam et al.

(10) Patent No.: US 10,588,030 B2
(45) Date of Patent: Mar. 10, 2020

(54) SWITCHING FREQUENCY BAND OF RADIO OF ACCESS POINT

(71) Applicant: Hewlett Packard Enterprise Development LP, Houston, TX (US)

(72) Inventors: Shanmugamari Shanmugam, Bangalore Karnataka (IN); Celestian Kenlampady Sebastian, Bangalore Karnataka (IN); Asvin Kumar Muthurangam, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 97 days.

(21) Appl. No.: 15/227,127

(22) Filed: Aug. 3, 2016

(65) Prior Publication Data
US 2017/0041935 A1   Feb. 9, 2017

(30) Foreign Application Priority Data

Aug. 5, 2015   (IN) .......................... 4063/CHE/2015

(51) Int. Cl.
| | | |
|---|---|---|
| *H04W 72/04* | (2009.01) | |
| *H04W 28/08* | (2009.01) | |
| *H04W 24/02* | (2009.01) | |
| *H04W 36/22* | (2009.01) | |
| *H04W 36/08* | (2009.01) | |
| *H04W 88/10* | (2009.01) | |

(52) U.S. Cl.
CPC ............ *H04W 24/02* (2013.01); *H04W 36/08* (2013.01); *H04W 36/22* (2013.01); *H04W 88/10* (2013.01)

(58) Field of Classification Search
CPC ..... H04W 24/02; H04W 28/02; H04W 36/08; H04W 36/22; H04W 72/0453; H04W 72/0486; H04W 88/10
See application file for complete search history.

(56) References Cited

U.S. PATENT DOCUMENTS

| | | | |
|---|---|---|---|
| 7,865,150 B2 | 1/2011 | McFarland et al. | |
| 8,320,949 B2 | 11/2012 | Matta | |
| 2006/0223574 A1* | 10/2006 | Chandra ............... | H04W 88/06 455/552.1 |
| 2011/0158110 A1* | 6/2011 | Stacey ................. | H04W 24/00 370/252 |
| 2012/0300759 A1 | 11/2012 | Patanapongpibul et al. | |

(Continued)

FOREIGN PATENT DOCUMENTS

| | | |
|---|---|---|
| WO | WO-2014076534 | 5/2014 |
| WO | WO-2014142066 | 9/2014 |

OTHER PUBLICATIONS

"Overview of the 1532 Access Point" printed on May 21, 2015 from: http://www.cisco.com/c/en/us/td/docs/wireless/access_point/1530/installation/guide/1530hig/1530_ch1.html.

*Primary Examiner* — Kevin C. Harper
*Assistant Examiner* — Derrick V Rose
(74) *Attorney, Agent, or Firm* — Hewlett Packard Enterprise Patent Department (57) ABSTRACT

According to an example, a first radio of an access point is operated on a first frequency band and a second radio of an access point is operated on a second frequency band. The second radio is switched from the first frequency band to the second frequency band.

14 Claims, 8 Drawing Sheets

(56) References Cited

U.S. PATENT DOCUMENTS

| | | | |
|---|---|---|---|
| 2013/0010719 A1* | 1/2013 | Shapira | H04W 72/082 370/329 |
| 2013/0165134 A1* | 6/2013 | Touag | H04W 72/0486 455/452.1 |
| 2015/0282032 A1* | 10/2015 | Gupta | H04W 36/22 370/237 |

* cited by examiner

SWITCHING FREQUENCY BAND OF RADIO OF ACCESS POINT

BACKGROUND

An access points (AP) is a device which a client device can connect to wirelessly in order to join a network. A client device may for example be a desktop computer, notebook computer, tablet computer, mobile phone or other device with wireless connectivity. The access point may provide access to a wired network such as an office's local area network (LAN) or the Internet.

Client devices typically connect to the access point using a wireless communication protocol and may use different frequency bands depending on the wireless protocol and hardware which the client device supports. Two commonly used frequency bands are 2.4 GHz and 5 GHz. Some client devices may be able to connect on both of these frequency bands, while other client devices may be able to connect on just one of these frequency bands. An access point may have two radios, one operating on 5 GHz and the other operating on 2.4 GZ, so that client devices may connect to the access point on either frequency band.

BRIEF DESCRIPTION OF THE DRAWINGS

Examples of the invention will now be described, by way of non-limiting example only, with reference to the accompanying drawings, in which.

DETAILED DESCRIPTION

Figure 1:
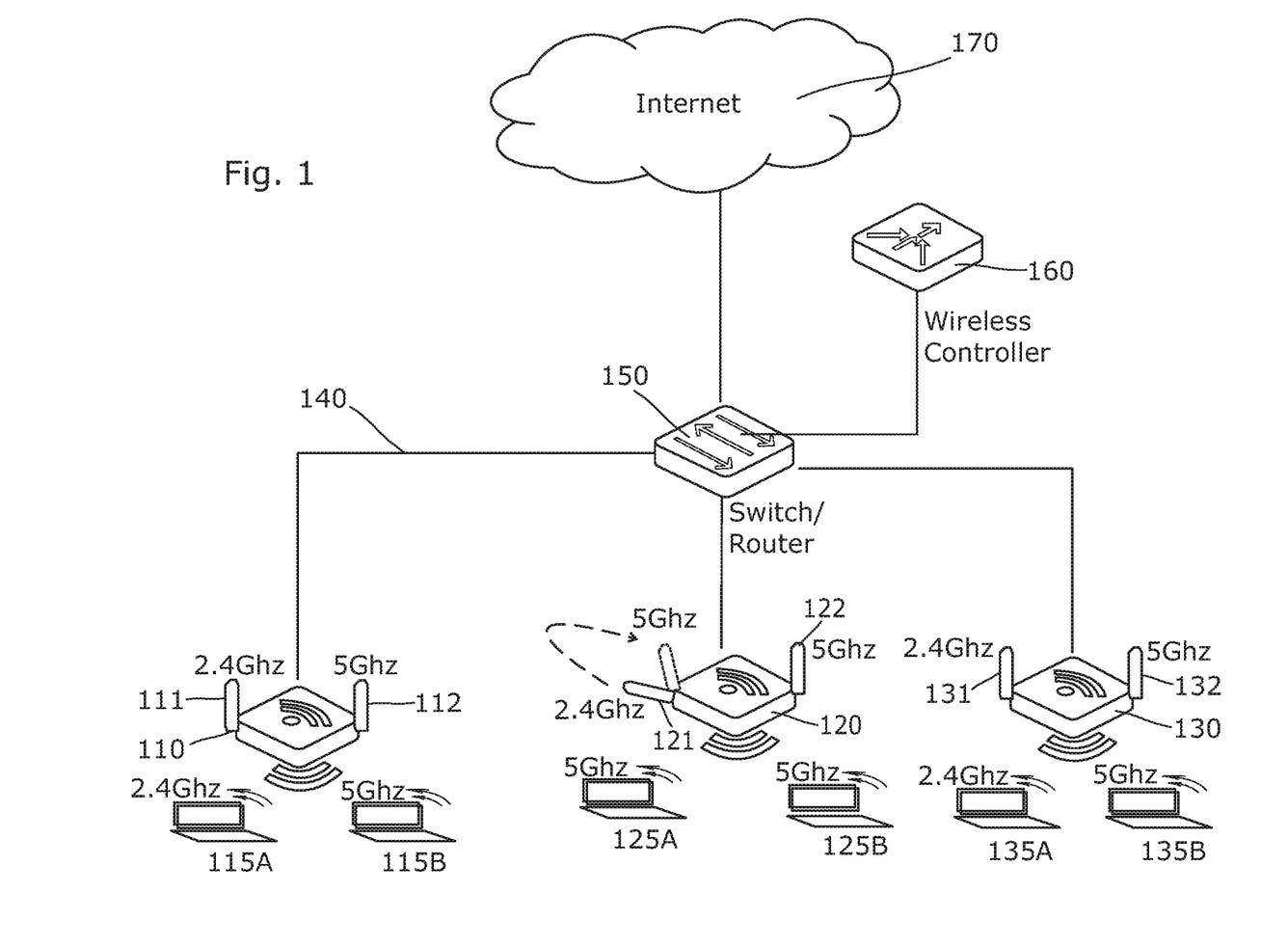
FIG. 1 shows an example of a network including an access point and wireless controller according to the present disclosure.

FIG. 1 shows an example of a network including a plurality of access points (APs) 110, 120 and 130. The APs are connected to a switch 150 and a Wireless Controller (WC) 160. The switch 150 may form part of a wired local area network (LAN) and thus connect the APs to other resources on the LAN, such as servers, printers, storage etc (not shown in FIG. 1). The switch 150 may also act as a router, or be connected to separate router on the LAN, so as to enables the APs to connect to the Internet 170. While the APs are connected to the switch 150 by wired links 140 in FIG. 1, in other examples some or all of the APs may connect wirelessly to the switch 150. In still other examples, rather than being connected to a LAN, an AP may include a router and connect directly to the Internet.

The wireless controller (WC) 160 manages the configuration of the APs. For example, the WC may manage which frequency bands and channels each AP uses to communicate with client devices. The WC may also monitor how many clients are associated with each access point. In some cases the WC may handle client device requests to authenticate and associate with an access point and manage roaming of client devices between access points. While the WC is shown as a separate device in FIG. 1, in other examples it may be integrated into the switch 150. In still other examples, the WC may connect wirelessly to the APs.

A plurality of client devices connect wirelessly with the APs. The client devices may for example be desktop computers, notebook computers, tablet computers, mobile phones or other wireless devices. Each client device may associate with a specific AP using a wireless communication protocol. By associate it is meant that the client device connects wirelessly with the AP such that it can send and receive data via the access point. The APs and client devices associated with the APs together form a wireless local area network (WLAN).

Some client devices may be able to connect with an AP on any of a plurality of frequency bands, while other client devices may be able to connect with an AP on just one frequency band. For instance, a client device having a 2.4 GHz radio may connect on the 2.4 GHz band, while a client device having a 5 GHz radio may connect on the 5 GHz frequency band. A client device having a separate radio for each frequency band, or a dual band 2.4 GHz/5 GHz radio may be able to choose to connect on either the 2.4 GHz or the 5 GHz frequency band.

The frequency band may depend upon the wireless communication protocol used to connect with the AP. One example of a commonly used wireless communication protocol is the 802.11 Institute of Electrical and Electronics Engineers (IEEE) standard. There are various versions of the 802.11 standard. Most recent client devices will support versions 802.11ac or 802.11an which use the 5 GHz frequency band, while older devices may support 802.11b or 802.11g which use the 2.4 GHz frequency band. These older devices are often not capable of supporting 5 GHz and may not even have a 5 GHz radio. While most new client devices support 802.11ac or 802.11an on 5 GHz, some also have backward compatibility and support older versions of the wireless protocol on 2.4 GHz as well. If a client device has a choice of which band to use, then the 5 GHz band is sometimes chosen, because it is less susceptible to electromagnetic interference and because 802.11ac and 802.11an are faster than earlier versions of the standard.

Thus in order to support a larger variety of client devices, an access point may have two radios: one supporting the 2.4 GHz frequency band and one supporting the 5 GHz frequency band. This works well in providing support for both frequency bands. However, as the 5 GHz band becomes more popular and the number of 5 GHz clients increases, the 2.4 GHz radio may be little used, while the 5 GHz radio may become overloaded.

The present disclosure proposes an access point that has a first radio capable of operating on at least two frequency bands, i.e. a multi-band radio. In addition the access point has a second radio which is capable of operating on at least the second frequency band. Further, the access point has a processor to switch the first radio to the second frequency band, so that both first radio and second radio are on the second frequency band.

In this way, the access point is capable of supporting client devices on both the first and second frequency bands, but when desired the first radio may be switched to the second frequency band, so that both the first and second radio operate on the second frequency band to more effectively support a larger number of clients on the second frequency band.

In the context of this disclosure, the terms "first" and "second" in first frequency band and second frequency band are simply used to differentiate the two frequency bands and do not necessarily indicate a particular order, precedence or other characteristic of the frequency bands. In one example the first frequency band is 2.4 GHz, while the second frequency band is 5 GHz. In other examples the first frequency band may be 2.4 GHz and the second frequency band 5 GHz. In still other examples the first and/or second frequency band may have different values.

FIG. 1, illustrates a principle of the present disclosure. There are three access points 110, 120 and 130. The second access point 120 includes a first radio 121 and a second radio 122. The first radio 121 is capable of operating on either a first frequency band or a second frequency band, while the second radio 122 is capable of operating on at least the second frequency band.

In FIG. 1, by way of example, the first frequency band is 2.4 GHz, while the second frequency band is 5 GHz. Thus, the second radio 122 is shown as a single band radio, operating on the 5 GHz frequency band. Meanwhile, the first radio 121 is shown as a multi-band radio capable of switching between 2.4 GHz and 5 GHz depending on the load on the access point and wireless traffic conditions etc. For example, the first radio 121 may initially operate in the 2.4 GHz frequency band, but if no clients are associated with it on the 2.4 GHz frequency band, then the first radio 121 may switch to the 5 GHz frequency band. This switching of frequency bands is indicated by the dotted lines in FIG. 1.

The factors that determine switching between frequency bands will be discussed in more detail below. For now, it should be noted that the frequencies above are just an example. In other examples the second radio may operate on 2.4 GHz. In still other examples, both radios may be multi-band radios capable of operating on both 2.4 GHz and 5 GHz. In still other examples, the frequency bands may be different, or there may be additional frequency bands which the first and/or second radios are capable of adopting.

In the example of FIG. 1, two clients 125A and 125B are associated with the second AP 120 on the 5 GHz frequency band. The AP 120 has two neighboring APs 110 and 120. The AP 110 may have a first radio 111 operating on 2.4 GHz and a second radio 112 operating on 5 GHz. A first client device 115A connects with the AP 110 on 2.4 GHz via the first radio 111, while a second client device 115B connects with the AP 110 on 5 GHz via the second radio 112. Likewise the AP 130 has two radios 131 operating on 2.4 GHz and 5 GHz respectively and a 2.4 GHz client device 135A and 5 GHz client device 135B associated with each radio. For simplicity the radios of the first and third APs 110, 130 are assumed to be single band radios, but in other examples any of the radios could be multi-band radios and the AP could be configured to allow switching of a first radio to the same frequency band as a second radio in response to wireless traffic conditions, such as for example the load on the AP. In other examples, there may be a different number of APs in the WLAN.

Figure 2:
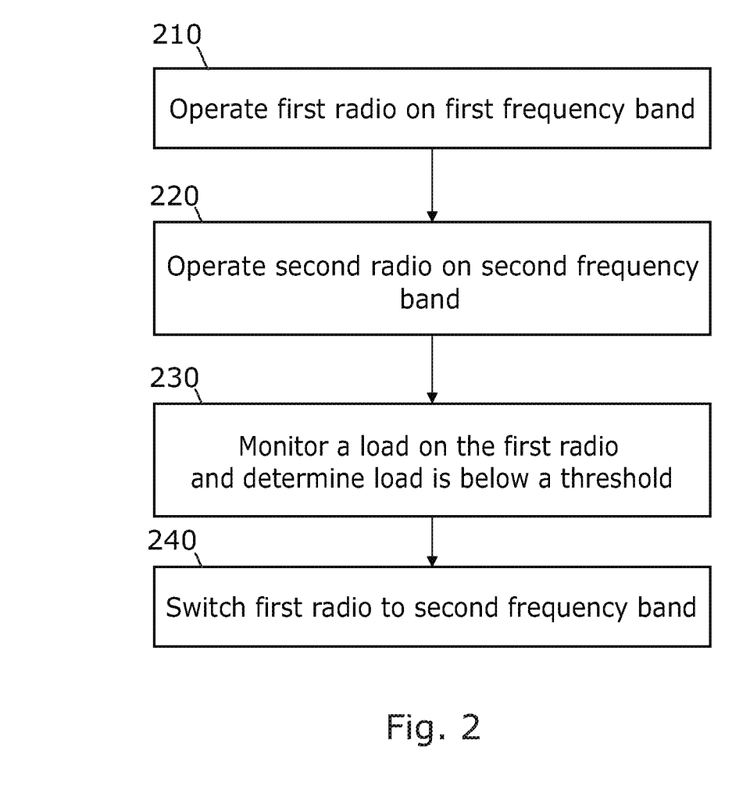
FIG. 2 shows an example method of switching a frequency band of a radio of an access point according to the present disclosure.

FIG. 2 shows an example of a method of managing an AP according to the present disclosure. The method may be implemented locally by the AP itself, remotely by a wireless controller (WC) which sends instructions to the AP, or by a combination of the two. Where there is a WC, the WC may directly connected to the DC, connected via a LAN, or may be implemented in the cloud, such as in a remote datacenter.

At block 210 the AP operates the first radio on the first frequency band.

In the context of the disclosure, operate on the first frequency band means that the radio wirelessly sends and receives messages from a client device over the first frequency band, or scans for client devices on the first frequency band.

At block 220 the AP operates the second radio on the second frequency band.

At block 230 a load on the first radio of the access point is monitored. The monitoring may be carried out locally by the AP, or the monitoring may be carried out remotely by a WC based information sent to the WC by the AP.

Monitoring the load on the first radio means monitoring a parameter related to the load on the first radio. For example, monitoring the load may include monitoring a number of clients associated with the radio, a volume or rate of traffic handled by the radio etc. The number of clients associated with the radio may be taken as the number of clients that have established a connection with the AP via that radio. For instance a number of clients associated with the AP on a frequency band and channel used by the radio.

At block 240, in response to determining that the load on the first radio is below a threshold, the first radio of the AP may be switched from the first frequency band to the second frequency band. As a result both first radio and the second radio of the AP are now operating on the second frequency band. While the first radio and second radio are operating on the same frequency band, they may use different channels of the frequency band, as discussed in more detail below.

Determining whether the load is below a threshold may be carried out locally by the AP, or remotely by a WC. The threshold may be a relatively low threshold, indicating that the radio is little used. In one example, the threshold is one client device, such that if just one client device is associated with the radio on the first frequency band, the radio remains on the first frequency band. However, if no client devices are associated with the radio on the first frequency band, then this is below the threshold and the radio may be switched to the second frequency band.

For instance, in the example of FIG. 1 two client devices operating on 5 GHz are associated with the AP 120. As there are no client devices operating on 2.4 GHz associated with the second AP, the first radio 121 may switch from the 2.4 GHz frequency band to the 5 GHz frequency band. In other examples, the threshold for switching may be higher, for example less than a certain small number of clients on the 2.4 GHz frequency band or below a certain volume or rate of traffic.

Figure 3:
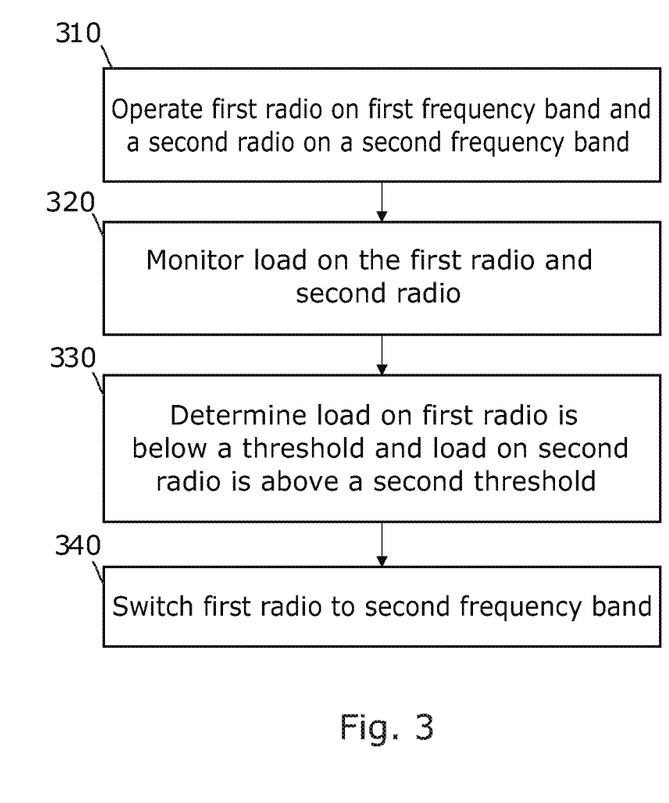
FIG. 3 shows another example method of switching a frequency band of a radio of an access point according to the present disclosure.

FIG. 3 shows an example method similar to FIG. 2, but differs in that the loads on both the first radio and load on the second radio are taken into account. The first radio is switched to the second frequency band if both the load on the first radio is below a threshold and a load on the second radio is above a second threshold. In one example the second threshold may be set as a relatively high threshold. For example, a load above which the ability of the second radio to serve all the associated client devices or the rate at which it can serve associated client devices is negatively impacted. In this way, the first radio switches to the second frequency band if the load on the second radio is high. This helps to balance load. However if the load on both the first radio and the second radio is low, then the first radio may remain on the first frequency band.

The operations in blocks 310, 320 and 340 of FIG. 3 are the same as blocks 210, 220 and 240 of FIG. 2 respectively. However, at block 330 the determination is based on both a load on the first radio on the first frequency band and a load on the second radio on the second frequency band as described above.

Figure 4:
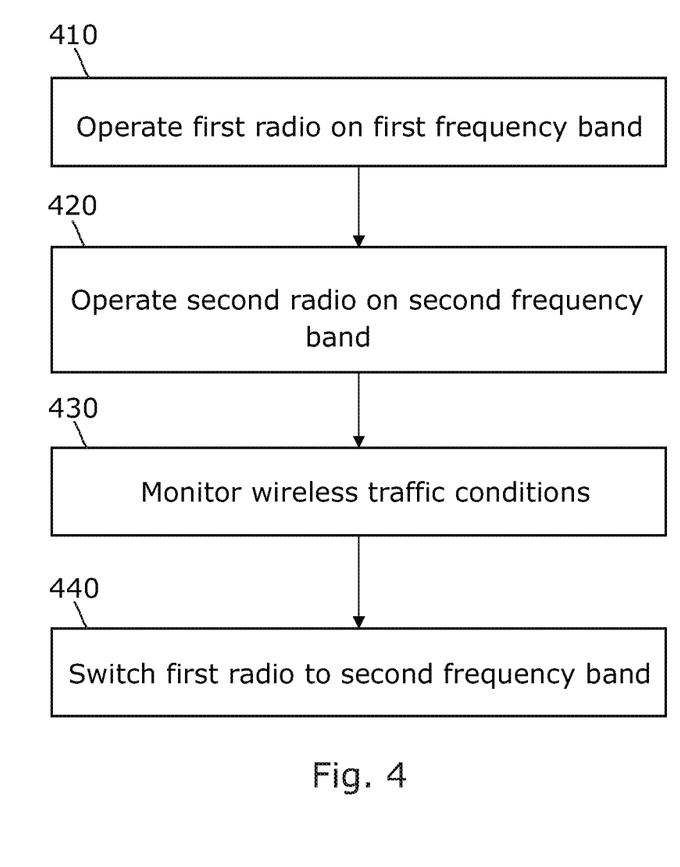
FIG. 4 shows another example method of switching a frequency band of a radio of an access point according to the present disclosure.

FIG. 4 shows an example method similar to FIG. 2, but is more generic as the determination whether to switch frequency band of the first radio is based on the wireless traffic conditions. The wireless traffic conditions means any one, or a combination of, the following: a number of clients associated with the access point on the first frequency band, a number of clients associated with the access point on the second frequency band, a load on the first radio of the access point, a load on the second radio of the access point, wireless interference affecting traffic to the access point and the traffic load of adjacent access points on the first frequency band and traffic load of adjacent access points on the second frequency band. These may be monitored by the AP, by a WC, or a combination of both.

By taking into account one, some or all of the above factors, it may be determined whether the first radio should operate on the first frequency band or the second frequency band.

Blocks 410, 420 and 440 of FIG. 4 are the same as blocks 210 and 220 of FIG. 2 respectively. At block 430 the wireless traffic conditions are monitored as described above. At block 440 in response to the wireless traffic conditions, the AP switches the first radio to the second frequency band. The AP may, for instance, do this when the wireless traffic conditions are such that a better service can be provided by switching the first radio to the second frequency band. For instance, it may be determined that the load between the first and second radio can be better balanced by switching the first radio to the second frequency band. In another example, it may be determined that the first frequency band is suffering from interference, such that it is best to switch to the second frequency band.

FIG. 4, described above, shows actions of the AP. The actions may be controlled locally by the AP of its own accord, or implemented by the AP upon receiving instructions from a WC, or a combination of both.

Figure 5:
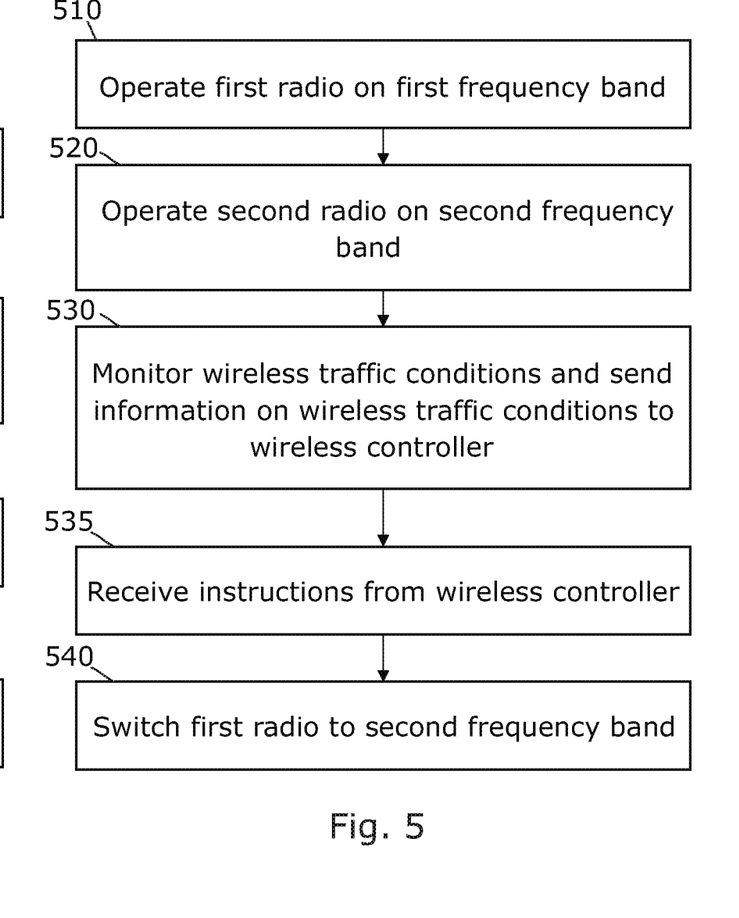
FIG. 5 shows another example method of switching a frequency band of a radio of an access point according to the present disclosure.

FIG. 5 shows a similar method which in which an external WC makes a determination and instructs the AP. The WC may be connected to the AP over a wired connection or LAN as shown in FIG. 1, or may be hosted in the cloud, such as a remote data center.

Blocks 510 and 520 are the same as blocks 410 and 420 of FIG. 4. The WC may send instructions to the AP to operate the radios in this manner, for example by adjusting a configuration of the AP. At Block 530 the AP monitors the wireless traffic conditions and sends information relating to the wireless traffic conditions to the WC.

At block 540 the WC receives information on the wireless conditions and may monitor the wireless traffic conditions based on the received data. In some examples, the WC may also receive information relating to wireless traffic conditions from other sources, for example other APs in the same WLAN. The WC may analyze the wireless traffic conditions to determine whether to switch the first radio to the second frequency band.

At block 550 the WC may send instructions to the AP to switch the first radio to the second frequency band.

At block 560 the AP may switch the first radio to the second frequency band.

In one example, with reference to FIG. 1, the WC may discover that there are just a few client devices associated with the first radio 121 of the second AP on a first frequency band 2.4 GHz, and many client devices associated with the second radio 122 on a second frequency band 5 GHz. The WC may further discover that neighboring AP 110 has spare capacity on the 2.4 GHz frequency band. In response to this the WC may determine to migrate some client devices on the 2.4 GHz band from the first radio 121 of the second AP 120 to a radio 111 of the first AP 110. On the other hand, if the neighboring APs do not have spare capacity on the first frequency band 2.4 GHz and, the WC may determine to keep the first radio 121 of the second AP on the first frequency band.

Figure 6:
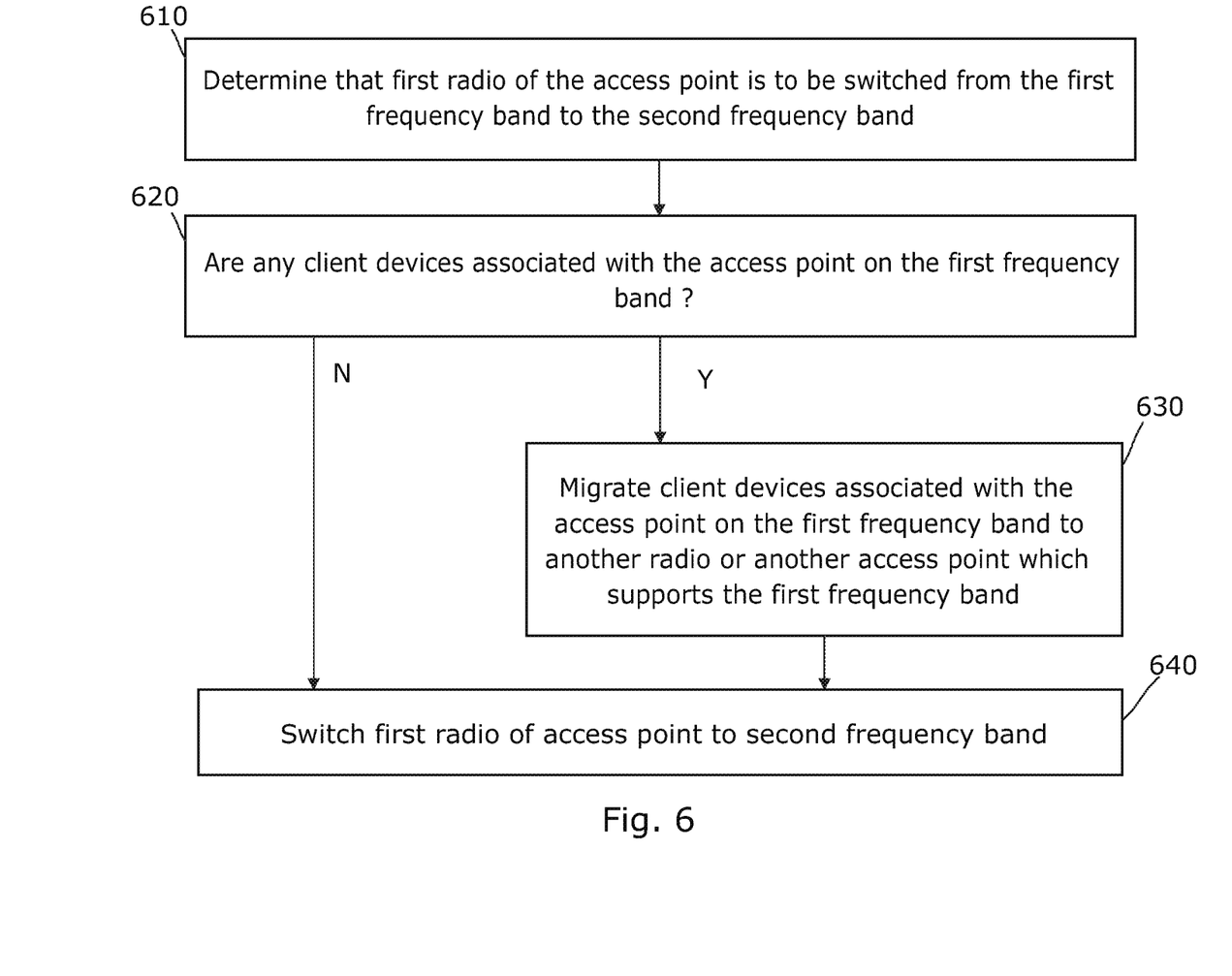
FIG. 6 shows another example method of switching a frequency band of a radio of an access point according to the present disclosure.

FIG. 6 shows an example method of managing an AP in more detail. This method may for example be used if the threshold, or criteria, for switching the first radio to the second frequency band is set such that the first radio may be switched even if some client devices are associated with the first radio on the first frequency band.

At block 610 it is determined that the first radio of the AP is to be switched from the first frequency band to the second frequency band. This determination may be made by any appropriate method, for instance any of the examples shown in FIGS. 2 to 5 described above.

At block 620 a check is made whether any client devices are associated with the first radio of the AP on the first frequency band. If not then the method proceeds to block 640, but if yes, then the method proceeds to block 630.

At block 630, the client devices which are associated with the AP on the first frequency band, are migrated to another radio or another AP which supports the first frequency band. For instance, the client devices may be migrated to a radio of a neighboring AP which supports the first frequency band, such as radio 111 of AP 110 in FIG. 1. In another example, if the AP has more than two radios and one of the further radios is operating on the first frequency band and has free capacity, then the client devices may be migrated to that radio.

At block 640, after the migration of the client devices has been completed, the first radio of the AP is switched from the first frequency band to the second frequency band. The first radio is then able to associate with client devices on the second frequency band.

The above description refers to a first frequency band and a second frequency band. It should be noted that a frequency band typically encompasses a range of frequencies and may be split into a plurality of channels. Each channel represents a sub-set of frequencies within the frequency band and may be separated by a certain distance from other channels within the same frequency band.

In an example, a frequency band may be specified in the order of GHz, while a channel may be identified by a number and correspond to a range of MHz within the frequency channel. For example, the 2.4 GHz frequency band is often divided into 14 channels which may be spaced 5 MHz apart. In one example the 2.4 GHz frequency band may begin with a first channel centered on 2.412 GHz and finish with a fourteenth channel centered on 2.484 GHz. The channels may have a width of 22 MHz. Meanwhile, in one example, the 5 GHz frequency band may extend from 5.15 to 5.725 GHz and be split into channels having a width of 80 MHz or 160 MHz. In some cases, not all of the channels are overlapping, so the APs in a particular WLAN may use just some of the channels, but not all of the channels, in order to avoid cross-channel interference.

The above is just an example, as the exact extent of frequencies encompassed by a frequency band, and the available channels within a frequency band, may vary depending on the wireless protocol and the country in which the AP is deployed. Furthermore, in many countries wireless space is regulated, so authorities may stipulate that certain channels within a frequency band should, or should not, be used.

As discussed in the examples above, in accordance with the present disclosure a first radio and second radio of an AP may be operated on the same frequency band. In one example, the first radio and second radio may be operated on different channels of the same frequency band. This helps to separate client devices between the radios of the AP, while they are operating on the same frequency band. For instance, each radio may communicate with a set of client devices on a particular channel. Further, if the channels are non-overlapping, this helps to avoid interference between the first and second radios when they are operated on the same frequency band.

Figure 7:
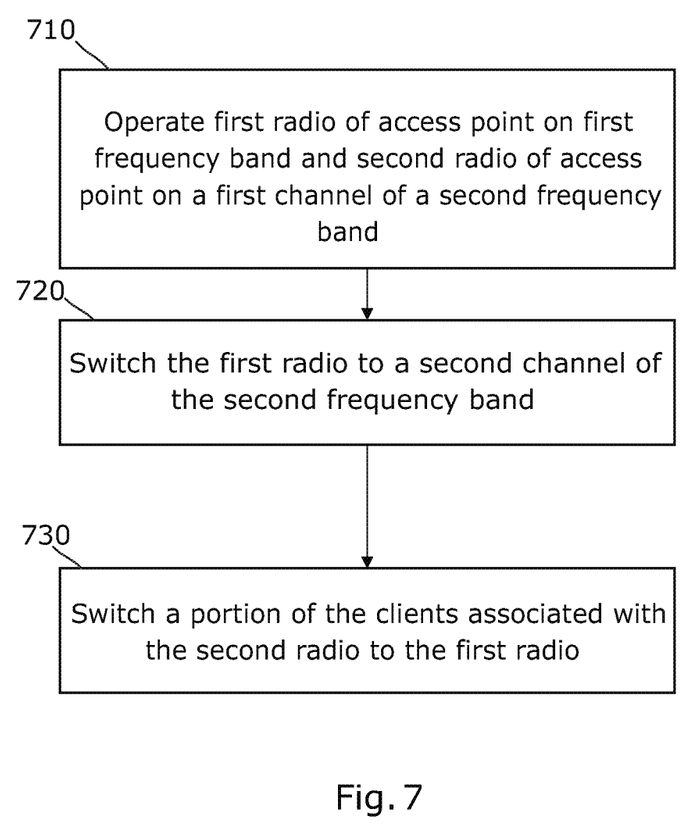
FIG. 7 shows another example method of switching a frequency band of a radio of an access point according to the present disclosure.

FIG. 7 shows an example method in which the first and second radio are operated on different channels.

At block 710, the first radio of the AP is operated on a first frequency band. The first radio may be on a channel of the first frequency band. Meanwhile, the second radio of the AP is operated on a first channel of the second frequency band.

At block 720, the first radio is switched to a second channel of the second frequency band. This second channel is a different to the first channel, but within the overall range of frequencies encompassed by the second frequency band. The second frequency band may be non-overlapping with the first channel of the second frequency band.

At block 730, a portion of the client devices associated with the second radio on the first channel of the second frequency band are switched to the second channel of the second frequency band used by the second radio. For example the client devices may be instructed to change to the second channel, or to dissociate with the AP and then re-associate with the AP on the second channel.

As the first radio is operating on the second channel, this method allows the load on the AP on the first frequency band to be split between the first radio and the second radio.

Figure 8:
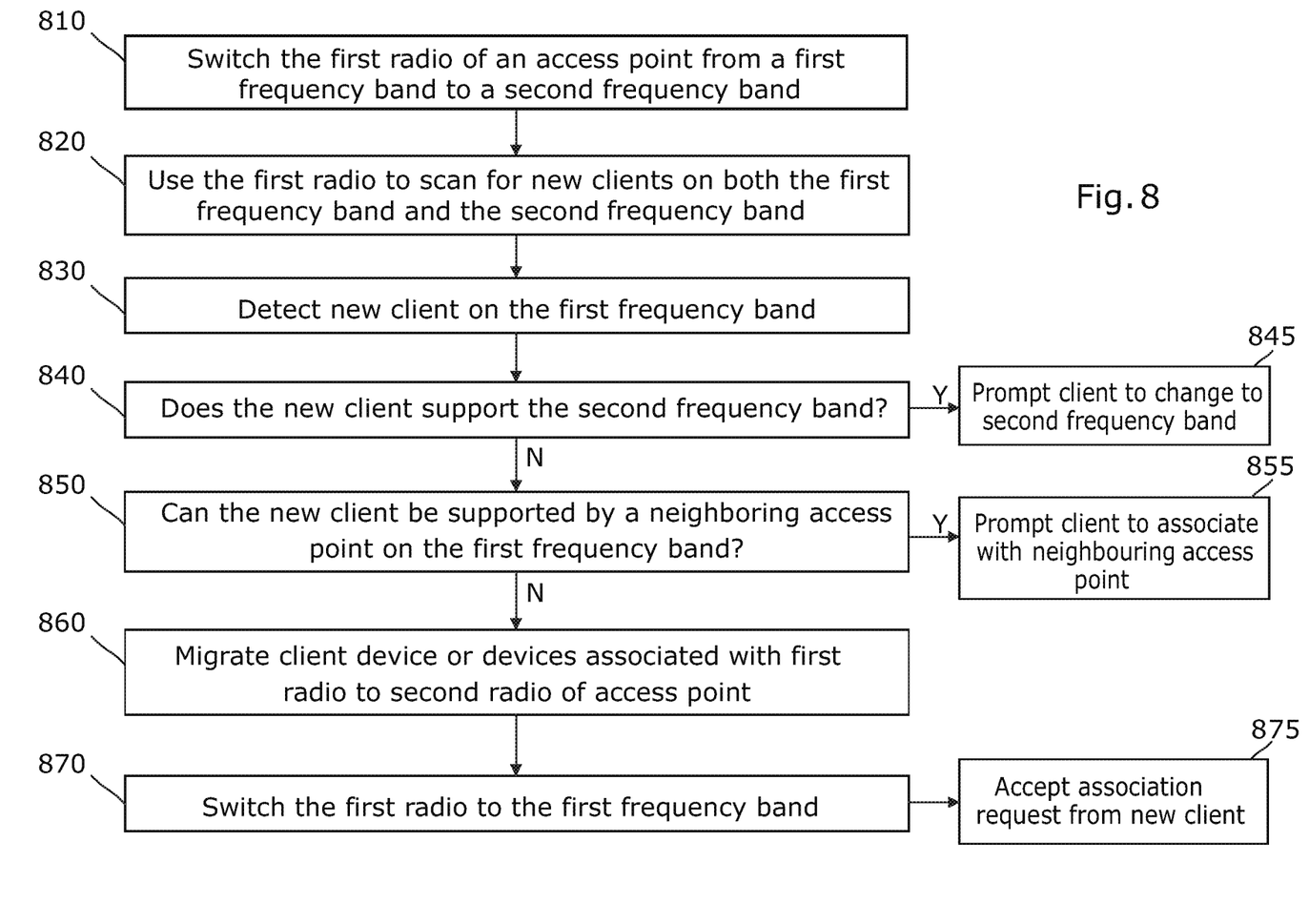
FIG. 8 shows another example method of switching a frequency band of a radio of an access point according to the present disclosure.

The wireless traffic conditions may change over time. Therefore, while at some times it be best for both the first radio and second radio to operate on the same frequency band, at other times it may be better for the first radio to operate on a first frequency band and the second radio to operate on a second frequency band. FIG. 8 shows one example of a method that enables the radios to switch back and forth between the frequency bands.

At block 810, the first radio of the AP is switched from a first frequency band to a second frequency band. This switching and the decision to switch may be in accordance with any of the example methods described above. In one example, the first radio may have switched to the second frequency band because no clients were associated with it on the first frequency band.

At block 820, the first radio scans for new clients on both the first frequency band and the second frequency band. That is, although the first radio is operating on the second frequency band, for instance sending and receiving messages to and from clients on the second frequency band, the first radio still scans for clients on the first frequency band. For instance, the first radio may periodically switch temporarily to the first frequency band to scan for client devices on that band, before switching back to the second frequency band to support the clients which it is associated with on the second frequency band.

The first radio may for example scan for clients on the first frequency band by sending a beacon on the first frequency band, or by receiving an unsolicited probe request on the first frequency band. In accordance with the method described herein, the first radio may do this without losing its association with the client devices on the second frequency band. For instance, the first radio may spend most of the time on the second frequency band sending beacons on the second frequency band and sending and receiving messages with client devices on the second frequency band, but periodically send a beacon on the first frequency band as well.

At block 830, the first radio detects a new client device on the first frequency band. For example, a new client device which uses the first frequency band, may have recently moved into the service area of the AP. The AP may, for example, detect the new client device by receiving a response to a beacon, or by receiving a probe request on the first frequency band.

At block 840, the AP may check whether the new client device supports the second frequency band. For instance the AP may determine this by reading information in a probe or join message sent by the client device, or by requesting this information from the client device. If the client device supports the second frequency band, then the method proceeds to block 845 where the client device is prompted to change to the second frequency band. Otherwise, the method proceeds to block 850.

At block 850, as the client device does not support the second frequency band, it is determined whether the new client device can be supported by a neighboring AP on the first frequency band. If yes, then the method proceeds to block 855 where the client is prompted to associate with a neighboring AP. Otherwise, the method proceeds to block 860.

At block 860, any client devices currently associated with the first radio on the second frequency band are migrated to another radio. For example, they may be migrated to the second radio of the AP which is operating on the second frequency band.

At block 870, after the client devices currently associated with the first radio have been migrated, the first radio is switched back from the second frequency band to the first frequency band.

Then at block 875, the AP may accept an association request from the first client device on the first frequency band. The client device may then associate with the first radio of the AP on the first frequency band.

Figure 9:
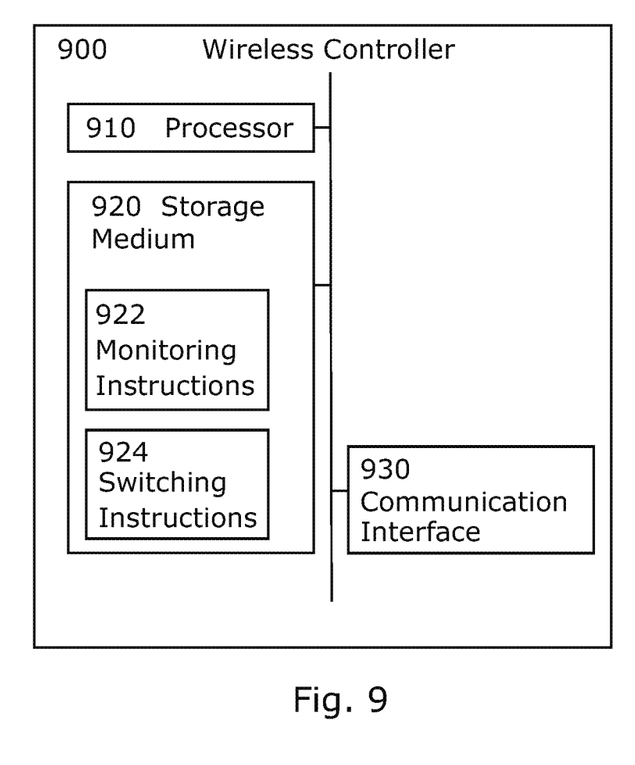
FIG. 9 shows another example wireless controller according to the present disclosure.

FIG. 9 shows an example of a wireless controller according to the present disclosure. The wireless controller may be used to implement any of the methods described above. The wireless controller may be used in a LAN, for instance such as the one shown in FIG. 1, or may be implemented as a physical or virtual wireless controller in the cloud with a control channel over the Internet or a layer 3 network to the AP.

The wireless controller 900 includes a processor 910 and a non-transitory machine readable storage medium 920. The storage medium 920 stores machine readable instructions which are executable by the processor 910 to carry out any of the processes in the methods described above. For instance the machine readable instructions may include monitoring instructions 922 to monitor the load on a radio of an access point, or more generally to monitor the wireless traffic conditions in the WLAN and/or pertaining to the access point. The machine readable instructions may also include switching instructions 924 to switch the first radio from a first frequency band to a second frequency band in response to the monitored load or wireless conditions. The wireless controller may further include a communication interface 930. The communication interface may include a wired interface, such as an Ethernet interface and/or a wireless interface to facilitate communication with the APs which it manages and any wired networks that the WC is connected to. The processor, storage medium and communication interface may for example be connected by a communication bus.

Figure 10:
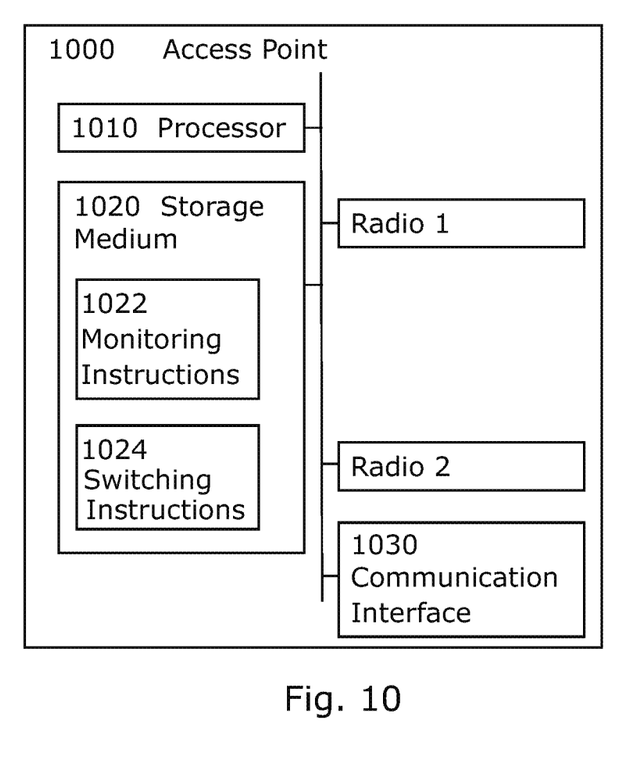
FIG. 10 shows an example access point according to the present disclosure.

FIG. 10 shows an example access point according to the present disclosure. The access point 1000 includes a first radio and a second radio to communicate wirelessly with client devices. The first radio is a multi-band radio and is capable of operating on at least a first frequency band and a second frequency band. The second radio may be a multi-band radio or a single band radio and is capable of operating on at least the second frequency band. The access point further includes a processor 1010 and a non-transitory machine readable storage medium 920. The storage medium 1020 stores machine readable instructions which are executable by the processor 1010 to carry out any of the processes in the methods described above. For instance the machine readable instructions may include monitoring instructions 1022 to monitor the load on a radio of the access point, or more generally to monitor the wireless traffic conditions in the WLAN and/or pertaining to the access point. The access point may act on the monitored load and conditions of its own accord, or send information to a WC and await instructions from the WC. The machine readable instructions may also include switching instructions 1024 to switch the first radio from a first frequency band to a second frequency band in response to the monitored load or wireless conditions or an instruction from the WC. The access point may further include a communication interface 1030. The communication interface may include a wired interface, such as an Ethernet interface to communicate with a WC and/or any wired network, such as a LAN or the Internet, which the AP is connected to. The processor, storage medium and communication interface may for example be connected by a communication bus.

Figure 11:
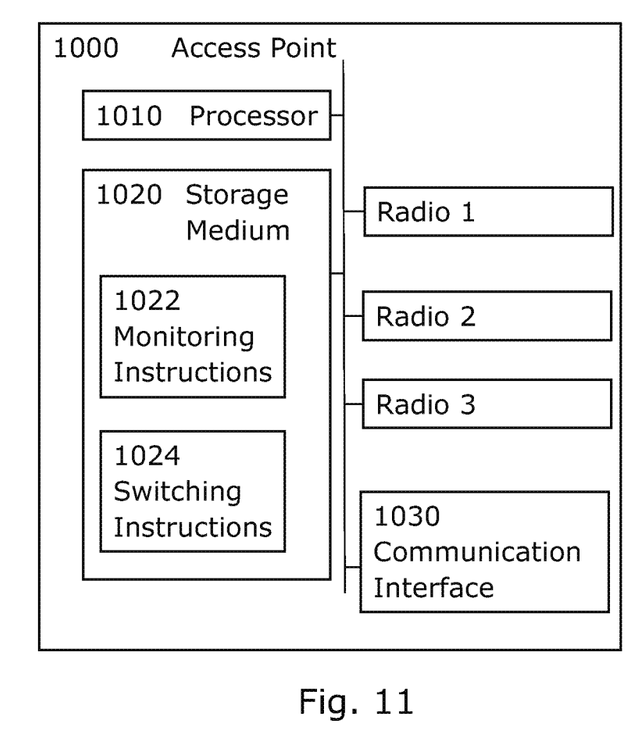
FIG. 11 shows another example access point according to the present disclosure.

FIG. 11 shows another example of an access point according to the present disclosure. The access point is the same as that shown in FIG. 10, except that it has three radios. The first radio is similar to the first radio of FIG. 11 and is a multi-band radio capable of operating on at least a first frequency band and a second frequency band. The second radio may be a multi-band radio or a single band radio and is capable of operating on at least the second frequency band. The third radio may be a multi-band radio or a single band radio and is capable of operating on at least the first frequency band. The first radio may switched between the first frequency band and the second frequency band based on the relative load of the second radio and the third radio. For example, if the load on the second radio or number of clients associated with the access point on the second frequency band is greater, then the first radio may be switched to the second frequency band. However, if the load on the second radio or number of clients associated with the access point on the first frequency band is greater then the first radio may be operated on the first frequency band. In other words the first radio may be switched between the first frequency band and the second frequency band in response to particular wireless traffic conditions in order to balance the load between the first radio and the second radio.

Figure 12:
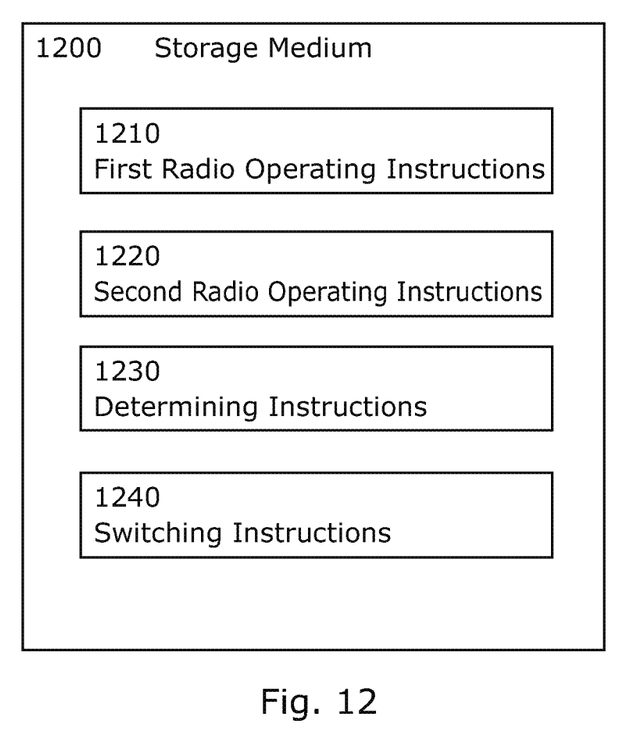
FIG. 12 shows an example storage medium storing machine readable instructions according to the present disclosure.

FIG. 12 shows an example of a non-transitory storage medium 1200 storing instructions for managing an access point according to the present disclosure. The non-transitory storage medium may for example be a hard disk, a solid state disk, a read only memory, or random access memory etc. The instructions are executable by a processor to carry out any of the methods described above. The instructions may include first radio operating instructions 1210 to operate a first radio of an access point on a first frequency band and second radio operating instructions 1220 to operate a second radio of an access point on a second frequency band. The instructions may further include determining instructions 1230 to determine whether to switch the first radio to the second frequency band. The determination may, for example, be made in accordance with any of the methods described above. The instructions further include switching instructions 1240 to switch the first radio from the first frequency band to the second frequency band after the determination to switch the frequency band has been made. The determining instructions and switching instructions may further include instructions to switch the first radio back to the second frequency band, for example if the wireless traffic conditions have changed in such a way that is desirable to operate the first and second radios on different frequency bands.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A wireless controller (WC) comprising a processor and non-transitory machine readable storage medium storing instructions executable by the processor to manage an access point (AP); the instructions including instructions to:
   cause a first radio of the access point to operate on a first frequency band;
   cause a second radio of the access point to operate on a second frequency band;
   monitor a load on the first radio of the access point;
   determine that the first radio is to be switched from the first frequency band to the second frequency band in response to determining that a load of the first radio on the first frequency band is below a threshold;
   determine there are any client devices associated with the access point operating in the first frequency band;
   cause the client devices associated with the access point operation in the first frequency band to migrate to another access point that supports the first frequency band; and switch the first radio from the first frequency band to the second frequency band and maintain operation of the second radio on the second frequency band, wherein the first radio stops operating on the first frequency band after the switch from the first frequency band to the second frequency band.

2. The wireless controller of claim 1 wherein the instructions are to switch the first radio from the first frequency band to the second frequency band in response to determining that the load on the first radio on the first frequency band is below said threshold and that the load on the second radio on the second frequency band is above a second threshold.

3. The wireless controller of claim 1 wherein the instructions include instructions to operate the second radio on a first channel of the second frequency band and to switch the first radio to a second channel of the second frequency band, said second channel of the second frequency band being non-overlapping with the first channel of the second frequency band.

4. The wireless controller of claim 3 further comprising instructions to balance load between the first radio and second radio by causing a portion of the clients associated with the second radio on the first channel to switch to the first radio on the second channel.

5. The wireless controller of claim 4 wherein the instructions are to cause a portion of the clients to switch from the first channel to the second channel by issuing a channel change command to said portion of the clients, or by causing said portion of the clients to dissociate with the access point and allocating said portion of the clients to the second channel when they re-associate with the access point.

6. The wireless controller of claim 1 wherein the instructions include instructions to, in response to detecting a client operating on a first frequency band entering a service area of the access point, cause the client to associate with a neighboring access point on the first frequency band or switch the first radio back to the first frequency band.

7. An access point (AP) comprising:
a first radio capable of operating on a first frequency band and a second frequency band,
a second radio capable of operating on at least a second frequency band,
and a processor to:
monitor wireless traffic conditions;
operate the first radio on the first frequency band and the second radio on the second frequency band;
determine that the first radio is to be switched from the first frequency band to the second frequency band in response to determining that a load of the first radio on the first frequency band is below a threshold;
determine there are any client devices associated with the access point operating in the first frequency band;
cause the client devices associated with the access point operation in the first frequency band to migrate to another access point that supports the first frequency band; and
switch operation of the first radio from the first frequency band to the second frequency band and maintain operation of operate both the first radio and the second radio on the second frequency band based on the monitored wireless traffic conditions, or based on an instruction received from an external wireless controller, wherein the first radio stops operating on the first frequency band after the switch from the first frequency band to the second frequency band.

8. The access point of claim 7 wherein the wireless traffic conditions include at least one of: a number of clients associated with the access point on the first frequency band, a number of clients associated with the access point on the second frequency band, a load on the first radio, a load on the second radio, wireless interference and the traffic load of adjacent access points on the first frequency band and second frequency band.

9. The access point of claim 7 wherein the AP is to operate the second radio on a first channel of the second frequency band, switch the first radio to a second channel of the second frequency band and cause at least one client of the AP to switch from the first channel of the second frequency band to the second channel of the second frequency band.

10. The access point of claim 7 wherein, while the first radio is associated with a client in the second frequency band, the processor is to cause the first radio to periodically scan for clients on both the first frequency band and the second frequency band.

11. The access point of claim 7 wherein, in response to receiving an association request from a client in the first frequency band while the first radio is operating on the second frequency band, the AP is to cause clients associated with the first radio on the second frequency band to switch to the second radio on the second frequency band and switch the first radio to the first frequency band.

12. The access point of claim 7 further comprising a third radio capable of operating on the first frequency band and wherein the processor is to switch the first radio between the first frequency band and the second frequency band based on the relative load on the second radio and the third radio.

13. A non-transitory computer readable storage medium storing instructions executable by a processor to:
operate a first radio of an access point on a first frequency band;
operate a second radio of the access point on a second frequency band;
determine whether the frequency band of the first radio should be switched from the first frequency band to the second frequency band;
determine there are any client devices associated with the access point operating in the first frequency band;
cause the client devices associated with the access point operation in the first frequency band to migrate to another access point that supports the first frequency band; and
in response to a determination that the frequency band of the first radio should be switched, switch the first radio from the first frequency band to the second frequency band;
wherein the first frequency band is one of 2.4 GHz and 5 GHz and the second frequency band is the other of 2.4GHz and 5GHz, and maintain operation of the second radio on the second frequency band, wherein the first radio stops operating on the first frequency band.

14. The non-transitory computer readable storage medium of claim 13 wherein the instructions to determine whether the frequency band of the first radio or the frequency band of the second radio should be switched, include instructions to switch the first radio to the second frequency band in response to determining that no clients are associated with the access point on the first frequency band.

* * * * *

UNITED STATES PATENT AND TRADEMARK OFFICE
CERTIFICATE OF CORRECTION

PATENT NO. : 10,588,030 B2
APPLICATION NO. : 15/227127
DATED : March 10, 2020
INVENTOR(S) : Shanmugamari Shanmugam et al.

Page 1 of 1

It is certified that error appears in the above-identified patent and that said Letters Patent is hereby corrected as shown below:

On the Title Page

Item (72), Inventors, replace "Kenlampady" with "Kaniampady" in Column 1, Line 9.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*